United States Patent [19]

Temes

[11] Patent Number: 4,602,291
[45] Date of Patent: Jul. 22, 1986

[54] PIXEL NON-UNIFORMITY CORRECTION SYSTEM

[75] Inventor: Gabor C. Temes, Los Angeles, Calif.
[73] Assignee: Xerox Corporation, Stamford, Conn.
[21] Appl. No.: 608,594
[22] Filed: May 9, 1984
[51] Int. Cl.$^4$ ............................................. H04N 5/14
[52] U.S. Cl. .................................... 358/221; 358/213
[58] Field of Search ........................ 358/213, 221, 241

[56] References Cited

U.S. PATENT DOCUMENTS

| | | | |
|---|---|---|---|
| 4,142,213 | 2/1979 | Glenn | 358/221 |
| 4,173,772 | 11/1979 | White | 358/221 |
| 4,298,887 | 11/1981 | Rode | 358/213 |

FOREIGN PATENT DOCUMENTS 53-123617  10/1978  Japan ................................. 358/221

*Primary Examiner*—Gene Z. Rubinson
*Assistant Examiner*—L. C. Schroeder
*Attorney, Agent, or Firm*—Franklyn C. Weiss

[57] ABSTRACT

A solid state imager wherein a pixel non-uniformity correction system compensates for photosite non-uniformities by providing a linear correction method and utilizing three modes: mode #1—dark current detection, mode #2—uniform illumination, and mode #3—data detection mode. In the first calibration cycle, the outputs of all the photocells on an imager 10, representing "dark current" are stored in an "offset" memory 14. In the second calibration cycle, a uniform illumination from a constant light level is applied to the imager 10. This uniform illumination signal is passed to an arithmetic unit 18 where the dark current signal is subtracted from it and the difference is then stored in gain memory 28. The gain memory passes this signal back to the arithmetic unit 18, so that in the third mode, the data detection mode, the arithmetic unit 18 can electronically correct the data signals that were non-uniformly affected by the internal characteristics of the imager.

7 Claims, 5 Drawing Figures

PIXEL NON-UNIFORMITY CORRECTION SYSTEM

This invention relates to imager arrays wherein a pixel non-uniformity correction system compensates for photosite non-uniformities by providing a linear correction method utilizing three modes: mode #1—dark current detection, mode #2—uniform illumination mode, and mode #3—the actual data detection mode.

BACKGROUND OF THE INVENTION

Image scanners are used to convert information from one medium to another. For example, in document scanning, the information on a document is converted from printed matter on a page to electrical signals for transmission to another unit, for information handling, for electronic storage, etc.

Charge coupled devices (CCD'S) utilizing charge transfer technology are one modern application of technology useful in image scanners. Light is impinged on the photosites on a CCD device, the device detecting this information and converting it to electrical signals for subsequent use. Such CCD imagers may comprise, for example, from 1,000 to 6,000 or more photocell or photosite areas. Because one photocell or photosite may be more or less sensitive than other photosites, or their dark currents may be different, the output signal may not be uniform. In order to separate the nonuniformity of the CCD or other imager arrays from varying light levels applied to the entire photoarray, a correction technique is desirable for accurate signal generation.

According to the present invention, circuitry is disclosed where, in the first calibration cycle, a calibration switch is placed in a first position, and the outputs of all the photocells in the imager represents "dark image". That is, no light is shined onto the photocells. The resulting offset values are then stored in an "offset" memory in analog or digital form, depending upon the particular circuit desired. In the second calibration cycle, with the switch in the second position, a uniform illumination from a constant light level is applied to all the cells in the imager array. In an arithmetic unit, the difference between the dark image and uniform illumination signal is generated and then it is stored, in digital form, in a gain memory. This gain memory thus contains the photocell gains in relation to the dark image. In the actual imaging mode, the actual pixel values of the image are generated by the circuitry fully compensated for dark current and gain non-uniformities in the linear array.

DESCRIPTION OF THE DRAWINGS

For a more complete understanding of the invention, reference may be had to the following detailed description of the invention in conjunction with the drawings wherein.

DETAILED DESCRIPTION OF THE INVENTION

In a linear correction method for pixel non-uniformities in a charge coupled device or other type of linear array, certain relationships have been found to exist. For example, the CCD imager response can be approximated by the linear relation $$Y = MX + B \tag{1}$$

where Y=the imager charge, X=the illuminating light level, while M and B are constants, where B is the offset (dark current) and M is the gain, that is, responsivity.

The constants M and B may be obtained if two calibration tests are performed, resulting in two corresponding sets of values X1, Y1 and X2, Y2. In particular, if X1 equals 0, that is, the illuminating light level is zero, then $$M = [(Y2 - Y1)/X2] \text{ and } B = Y1 \tag{2}$$

Therefore, substituting the values of M and B into the first equation, the output amount of light X can be determined from the following relationship $$X = [(Y - B)/M] = X2[(Y - Y1)/Y2 - Y1)] \tag{3}$$

with the relationship giving the correct value of illumination applied for a detected electrical charge Y. Thus, determining the applied input illumination X, this information can be utilized with subsequent circuitry for determining the input light level in relation to other signals to be used in information detection. Although the response of practical solid state imagers is not completely linear, the simulation described earlier by T. R. Hsing, "Correction of Pixel Nonuniformities for Solid State Imagers", Conf. Rec., Soc. Phot. Instr. Eng. Conf., August 1981, indicates that good results can be obtained in terms of improved uniformity and image quality by utilizing the above relationships in electronic circuits accomplishing the above relationships.

Such a circuit utilizes a combination of analog and digital techniques to achieve both high speed and accuracy. Thus, the system disclosed in the present invention calculates the true light input X from the stored values X2, Y1, and (Y2−Y1), and the actual image response Y.

Figure 1:
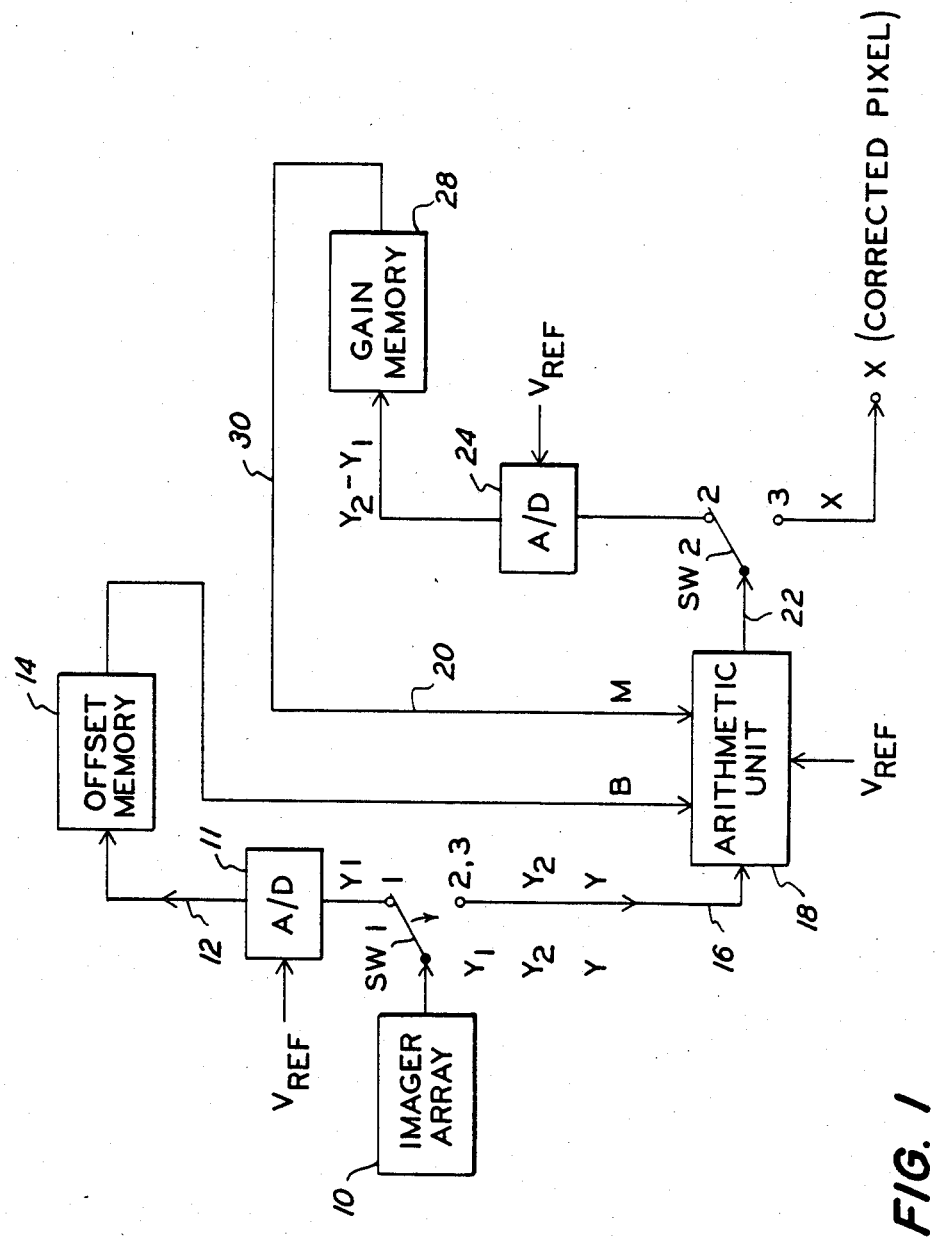
FIG. 1 is a block diagram of the pixel nonuniformity correction system in accordance with the principles of the present invention.

Referring now to FIG. 1, imager array 10 is seen to be coupled to switch 1 which has two positions, the first position being for mode 1 and the second position being for modes 2 and 3. In the first calibration cycle, switch 1 would be placed in the first position and the outputs Y1 of all the photosites in the imager array are generated for a "dark image". That is, the dark current from the imager array is detected when no light is directed to the imager array 10. This analog signal Y1 is then directed via A/D converter 11 to offset memory 14 which stores the dark current charge from each photosite area in imager array 10 in digital form. Thus, there has to be a memory location in offset memory 14 for each photosite area on imager array 10.

In the second calibration cycle, switch 1 would be switched to the mode 2, 3 position. At the same time, light is directed to imager array 10 of a uniform, known illumination level. This known illumination level X2 is applied to all cells in the imager array 10. The charge generated in each photocell in the imager array 10 is then directed to arithmetic unit 18 via input line 16. With the dark current signal Y1 having been stored at offset memory 14 and the uniform illumination signl Y2 now being directed to arithmetic unit 8, the difference signal Y2−Y1 can now be generated. That is, digital signals at the output of offset memory 14 are clocked into the arithmetic unit 18 at the same time the analog output from the photosites in imager array 10 is clocked into the arithmetic unit 18. The output from offset memory 14 is applied to the arithmetic unit 18 on lines 20 (one for each bit) and is termed value B as seen in the foregoing equations. The output from arithmetic unit 18 is then directed on line 22 to switch 2 which has two positions, one each for mode 2 and mode 3. When switch 1 is in the second mode position, switch 2 would also be in the second mode position and thus the output from arithmetic unit 18 would then be directed on line 22 to switch 2 and then to analog to digital converter 24 which converts the analog difference signal Y2−Y1 into a digital signal for application to gain memory 28. The gain memory stores this difference signal in digital form. This difference signal M is then directed on lines 30 (one for each bit) back to arithmetic unit 18, to be used in mode 3.

When the uniform illumination signal X2 is withdrawn and an actual data signal X is applied to the imager 10, switch 1 is already in the mode 2, 3 position, but switch 2 would now be placed in the mode 3 position. Thus, in a normal operating mode, data modulated light X would be applied to imager array 10 which generates the normal analog signal charge on line 16 and applied to arithmetic unit 18. The dark current offset is applied on input lines 20 to the arithmetic unit to perform the subtraction operation described above. That is, the actual light charge Y is presented on line 16 to the arithmetic unit and the dark current signal Y1 stored at offset memory 14, now digital signal B on lines 20, is presented to the arithmetic unit 18 and the subtraction process begins there. The control signal M which is the digital signal representative of the value Y2, the uniform illumination signal, minus the dark current signal Y1, represented by the value M, is now presented to the arithmetic unit 18 where the division process also takes place. The output X on line 22 is transferred via the mode 3 position on switch 2 to the output of the circuit and represents the corrected pixel signal as corrected by the circuit. Thus the relationship in the equation (3) above has indeed been performed by the arithmetic unit to generate the corrected pixel signal.

Figure 2:
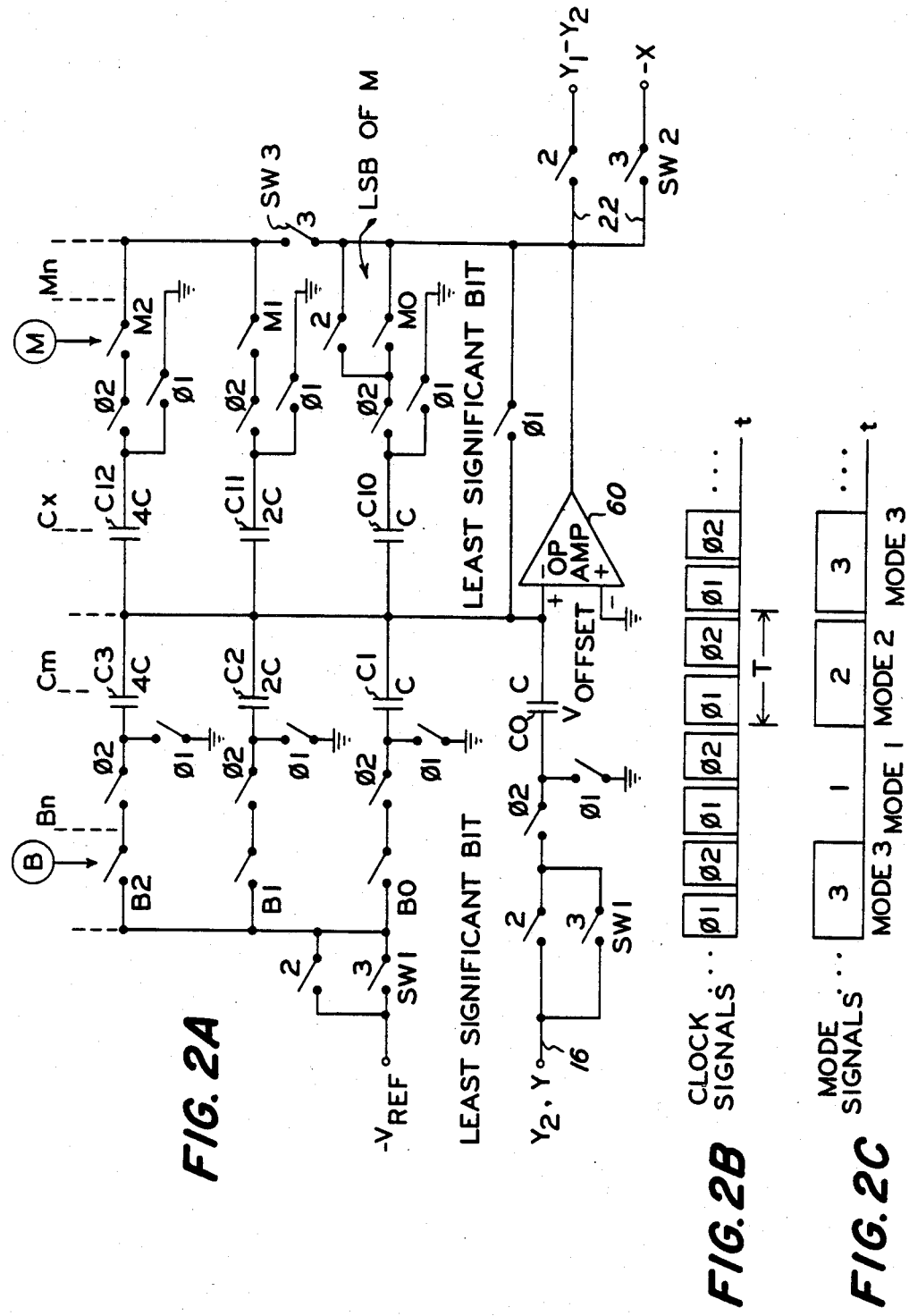
FIG. 2 is a schematic diagram of the arithmetic unit of FIG. 1 in relation to the present invention.

FIG. 2 of the present application shows the actual circuitry of the arithmetic unit 18 in FIG. 1. The input line 16 to the arithmetic unit 18 is also indicated in FIG. 2. The input B to the arithmetic unit 18 is indicated by the B in the circle with an arrow pointing to switches B0 to Bn to indicate that the digital signals from offset memory 14 are used to trigger these switches depending on their binary values. Thus, a binary 1 applied to switch B0 would close that switch. On a CCD or other integrated circuit, that switch could be an MOS transistor (or several MOS transistors) with the digital signal applied to the gate, thereby closing the switch. The signal M input from gain memory 28 is also indicated by an M in a circle with an arrow which is used to indicate the opening and closing of switches M1 through Mn in FIG. 2. The output of the arithmetic unit 18 is seen to be on line 22 which is then coupled to the output of the system via switch 2.

This circuit works in two modes, an autozero mode, that is a self calibration mode, and an operating mode. All the switches labeled $\emptyset 1$ would be closed in the first mode or the autozero mode, which as seen by the various switches labeled $\emptyset 1$ would couple the various capacitors and other circuits in a manner which compensates for the amplifier offset voltage during the operating mode when $\emptyset 2$ is high. The details of the autozero process are described by R. Gregorian, "High Resolution Switched-Capacitor D/A Converrter", Proc. 1980 Asilomar Conference on Circuits, Systems, and Computers. When $\emptyset 2$ is applied to the other switches of the system, the $\emptyset 1$ switches are open while the $\emptyset 2$ switches are closed. Switches 1 in FIG. 2 show that the system is essentially disabled when switch 1 is in the first operational mode as set forth and described in FIG. 1. In modes 2 and 3, it can be seen that a negative reference voltage −Vref is applied to the upper part of the circuit in FIG. 2 while the values Y2, or Y are applied to line 16 and thus the rest of the circuit in FIG. 2. Depending on the digital signal input applied to switches B0 to Bn, the various switches are closed or opened accordingly. Thus the negative reference voltage −Vref is applied to capacitor C1 which has a value of C, C2 which has a value 2C, or C3 which has a value 4C and so on throughout as many capacitors as there are bits in the signal input from signal B. That is, if signal B is an 8 bit signal, then there would be 8 capacitors in this circuit. If B is a high value signal, that is, comprising many binary ones in the 8 bit signal, for example, then most of the switches B0 through Bn would be closed, the charge from −Vref would be applied through switches $\emptyset 2$ which are now closed and selectively charge capacitors C1 through Cn. This signal being a negative charge is, therefore, effectively subtracted from the actual photosite charge signal Y applied through switch 1 to capacitor C0 coupled to the input of operational amplifier 60. The said charges enter during the operating mode the feedback capacitors connected between the output and inverting input terminals of the OP amp 60. In mode 2 the switch SW3 is open, and only capacitor C10 is connected to the output lines 22. In mode 3, SW3 is closed. At the same time, the digital signal M from the gain memory 28 is applied to switches M0 to Mn which are utilized to connect in parallel capacitors C10 through Cx which also have values C, 2C, 4C, as do the other capacitors herein described above. Depending upon the digital value of the input signal M, the various capacitors C10 through Cx are connected in parallel which effectively changes the value of the feedback capacitance across the operational amplifier 60, therein changing its gain. Thus the input signal B triggers the subtraction process while the input signal M (present only in mode 3) triggers the division process which affects the gain of amplifier 60 and thus the output signal. Now, if switch 2 was in the mode 2 position, the output signal would be the Y2 minus Y1 signal to the input of the gain memory 28. If the circuit is in the mode 3 or operational mode, the output at switch 2 would open the mode 2 switches and close the mode 3 switches so that the output of the circuit is the signal −X which is the negative of the corrected pixel signal.

Thus, the key building block of the system is the arithmetic unit 18. Assuming that a digital offset memory is used, the circuitry has been shown and described above in conjunction with FIG. 2. The circuit functions during calibration cycle 2 and during imaging. In calibration cycle 2, the offset B is recalled from the offset memory and its bits B0, B1 to Bn are used during ∅2 to feed a charge equal to $$-\sum_{i=0}^{n} (Bi)2^i C \, V\text{ref} = -(Y1)C \qquad (4)$$

into the feedback capacitor C of the operational amplifier 60. At the same time, a charge Y2C is also delivered to the feedback capacitor by the lower input branch so that the net charge is (Y2−Y1) C. The output voltage is therefore (Y1−Y2). The absolute value of the output, which is (Y2−Y1), is analog-to-digital converted and stored in the gain memory in the form of bits M0, M1 to Mn.

In the imaging mode 3, the input is Y, and the charge delivered to the feedback branch is (Y−Y1) C. Now, however, the feedback capacitor has the value $$\sum_{i=0}^{n} (Mi)2^i C = (Y2 - Y1)C/V\text{ref} \qquad (5)$$

Hence, the output voltage is $$V_{\text{out}} = -V\text{ref} \frac{(Y - Y1)C}{(Y2 - Y1)C} = -V\text{ref} X \qquad (6)$$

Thus, apart from the unimportant constant scale factor −Vref/X2, the desired corrected pixel value of equation 3 is indeed generated.

The output voltages are generated in the circuit during ∅2. During the period when ∅1 is high, all capacitors are discharged to Voffset, the offset voltage of the operational amplifier 60. The polarities are such that the operation is independent of Voffset. It is also fully insensitive to stray capacitance effects.

The circuit can be fabricated with a high accuracy, since all capacitors' ratios are powers of 2, and hence all capacitors can be constructed from equal sized unit capacitors. The digital operation takes place in parallel, i.e., all bits are effective at the same time. A two phase clock is used, and a data rate of 1/T pixels/seconds can be maintained after the calibration cycles are completed. Here, as shown in FIG. 2, T is the period of the ∅1 and ∅2 clock signals.

Figure 3:
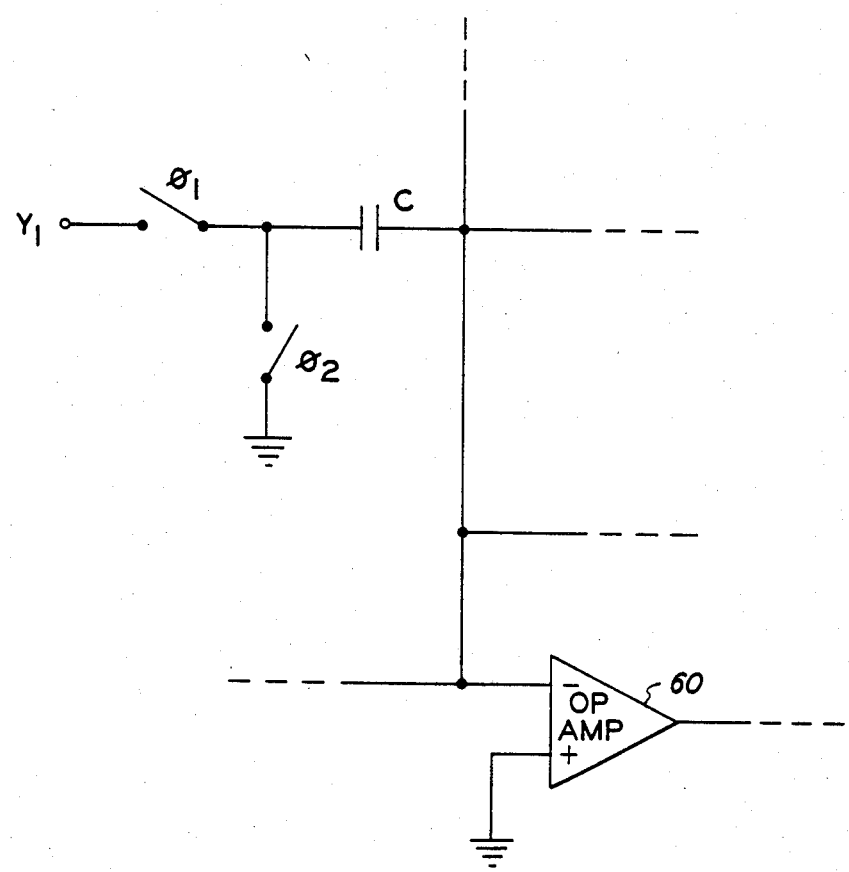
FIG. 3 is a simplified version of FIG. 2, where an analog, rather than digital, offset memory is used.

The operation is somewhat simpler if an analog offset memory is used. In this case, the A/D converter 11 is not needed. Then the upper input branch of the operational amplifier (connected to −Vref in FIG. 2) can be replaced by the simpler branch circuit in FIG. 3. The resulting circuit is still free of all offset voltage and parasitic capacitance effects, and needs only about half as many capacitors and switches as the one shown in FIG. 2. In this circuit, the capacitor C acquires a charge Y1C when ∅1 is high, and delivers a negative charge −Y1C to the amplifier's feedback branch when ∅2 goes high.

A mixed mode (analog and digital) system was described which implements a linearized imager nonuniformity correction system. It has a relatively simple structure, and is potentially fast and accurate. It has a limited range of correction ability; hence, if necessary, it should be combined with a neighbor interpolation circuit. The latter will be activated if either M or B is found to be beyond the dynamic range of the analog to digital converter. Alternatively, a 1-D median filtering process may be used to eliminate any faulty pixels.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

I claim:

1. A pixel non-uniformity correction system for use in an imager (10) wherein said system operates in three separate modes, the improvement comprising:

offset memory means (14) coupled to said imager for storing the dark current signal from said imager in a first mode when no light is directed to said imager, arithmetic unit means (18) coupled to said imager and said offset memory means for storing the signal from said imager in a second mode when a light of uniform, predetermined level is directed to said imager, said arithmetic unit means also subtracting the dark current signal received from said offset memory means from the signal generated upon application of said uniform light thereby generating a difference signal, gain memory means (28) coupled to said arithmetic unit means for receiving and storing said difference signal, said gain memory means also coupled back to said arithmetic unit means for presenting said difference signal to said arithmetic unit means when the system is placed in a third, operating mode, first switch means (SW2) for switching the output from said arithmetic unit means from said gain memory means to the system output such that said arithmetic unit means now compensates actual data signal from said imager upon data modulated light directed thereto for non-uniformities in each photosite of said imagers, and second switch means (SW1) for coupling said imager to the offset memory means in the first mode and to the arithmetic unit means in the second and third modes.

2. A system for correcting pixel non-uniformities in a solid state imager, where said imager response can be approximated by the linear relation $$Y = MX + B$$

where Y is the imager charge, X is the illuminating light level, and M and B are constants, wherein M and B may be obtained from two relationships X1, Y1 and X2, Y2 where Y1 is the dark current when X1 is zero, and Y2 is the current when X2 is uniform, such that $$M = [(Y2 - Y1)/X2] \text{ and } B = Y1$$

when said applied light, X1, is zero in a first mode, and X2 is uniform in a second mode, the value of said data modulated light applied in an operating mode being thus determined by the relationship $$X = [(Y - B)/M] = X2[(Y - Y1)/(Y2 - Y1)]$$

comprising:

offset memory means (14) coupled to said imager for storing the dark current signal Y1 from said imager in a first, calibration, mode, when no light is directed toward said imager, arithmetic unit means (18) coupled to said imager and said offset memory means for processing the signal Y2 from said imager in a second, calibration, mode when a uniform level light X2 is directed toward said imager, said arithmetic unit means subtracting from the dark current signal Y1 received from said offset memory means the signal generated upon application of said uniform light X2 thereby generating a difference signal Y1−Y2, gain memory means (28) coupled to said arithmetic unit means for receiving and storing the absolute value Y2−Y1 of said difference signal Y1−Y2, said gain memory means also coupled back to said arithmetic unit means for presenting said absolute value Y2−Y1 to said arithmetic unit means when the system is in a third, operating mode, said absolute value Y2−Y1 being divided into the data modulated signal Y when data modulated light is directed toward said imager which has had subtracted from it the dark current Y1, and means (SW2) for directing the subsequent signal −X representative of data modulated light being directed to said imager in an operational mode out from said system rather than directed back to said gain memory as in said second calibration mode.

3. An arithmetic circuit comprising:

a first plurality of capacitor means (C1−Cm), the second terminals of capacitor means being directly connected together, a first plurality of switch means (B0−Bn) for selectively coupling the first terminals of said first plurality of capacitor means to a reference voltage, said first plurality of switch means being selectively responsive to first binary signals B being applied thereto, a second capacitor means (CO), the second terminal of which being directly connected to the second terminals of said first plurality of capacitor means, a second switch means (∅2) for coupling said second capacitor means, via the first terminal thereof, to an input applied signal source Y2 or Y, such that said charge transferred through said first plurality of capacitor means is subtracted from the charge transferred by said second capacitor means, a third plurality of capacitor means (C10−Cx) connected together, the first terminals of said third plurality of capacitor means being directly connected together and to the second terminals of said first plurality of capacitor means and said second capacitor means, a third plurality of switch means for selectively coupling the second terminals of said third plurality of capacitor means to a common point, said third plurality of switch means being selectively responsive to second binary signals M being applied thereto, and operational amplifier means (60) having first and second inputs and one input, said first input being connected to the second terminals of said first plurality of capacitor means and said second capacitor means and said first terminals of said capacitor means, said second input being grounded, and said output being connected to said common point of said third plurality of capacitor means, such that signal B is subtracted from signal Y2 (or Y), the resultant signal Y2−B (or Y−B) being divided by signal M, thus affecting the resultant gain of said operational amplifier.

4. The arithmetic circuit as set forth in claim 3 further including a fourth plurality of switch means (∅1) for connecting the first terminals of said first plurality of capacitor means and said second capacitor means and the second terminals of said third plurality of capacitor means to ground potential and to short circuit the output and inverting input of operational amplifier means (60).

5. The arithmetic circuit as set forth in claim 4 wherein said first plurality of capacitor means and said second plurality of capacitor means each includes capacitors, the values of which increase with the powers of two.

6. The arithmetic circuit as set forth in claim 5 further including a fifth plurality of switch means (∅2) for connecting said first and third pluralities of capacitor means and said second capacitor means to said reference voltage upon the selective actuation of said first plurality of switch means.

7. The arithmetic circuit as set forth in claim 6 further including a sixth switch means (SW3) in the return of said second terminals of said third plurality of capacitor means to selectively isolate said third plurality of capacitor means.

* * * * *